US005556627A

United States Patent [19]
LaFollette

[11] Patent Number: 5,556,627
[45] Date of Patent: Sep. 17, 1996

[54] BIPOLAR BATTERY CELLS, BATTERIES AND METHODS

[75] Inventor: Rodney M. LaFollette, Provo, Utah

[73] Assignee: Bipolar Technologies, Inc., Provo, Utah

[21] Appl. No.: 556,235

[22] Filed: Nov. 9, 1995

Related U.S. Application Data

[60] Continuation-in-part of Ser. No. 440,407, May 12, 1995, abandoned, which is a division of Ser. No. 321,692, Oct. 12, 1994, abandoned.

[51] Int. Cl.$^6$ .................................................. H01M 10/18
[52] U.S. Cl. .......................... 429/210; 429/215; 429/217; 429/225; 429/228; 429/245
[58] Field of Search ...................................... 429/210, 215, 429/217, 233, 245, 225, 228

[56] References Cited

U.S. PATENT DOCUMENTS

| | | | |
|---|---|---|---|
| 3,859,138 | 1/1975 | Narsavage et al. | |
| 4,064,207 | 12/1977 | DeCrescente | 264/29.6 |
| 4,098,965 | 7/1978 | Kinsman | 429/153 |
| 4,098,967 | 7/1978 | Biddick et al. | 429/210 |
| 4,164,068 | 8/1979 | Shropshire et al. | 29/623.1 |
| 4,208,473 | 6/1980 | Bradley | 429/112 |
| 4,259,389 | 3/1981 | Vine et al. | 428/192 |
| 4,326,017 | 4/1982 | Will | 429/228 |
| 4,506,028 | 3/1985 | Fukuda et al. | 502/101 |
| 4,594,300 | 6/1986 | Morioka et al. | 429/225 |
| 4,637,970 | 1/1987 | Yeh et al. | 429/153 |
| 4,758,473 | 7/1988 | Herscovici et al. | 428/408 |
| 5,141,828 | 8/1992 | Bennion et al. | 429/210 |
| 5,173,362 | 12/1992 | Tekkanat et al. | 428/283 |
| 5,232,797 | 8/1993 | Moulton et al. | 429/210 |
| 5,268,239 | 12/1993 | Roche | 429/18 |
| 5,288,560 | 2/1994 | Ginatta et al. | 429/210 |

OTHER PUBLICATIONS

Article in New Scientist dated Nov. 22, 1989, entitled Technology: Bi–Polar Batteries Break an Energy Barrier . . .

Article in J. Electrochem. Soc., vol. 127, No. 12, Dec. 1990, by Rodney M. LaFollette and Douglas N. Bennion entitled Design Fundamentals of High Power Density, Pulsed Discharge, Lead Acid Batteries.

*Primary Examiner*—Maria Nuzzolillo

[57] ABSTRACT

Bipolar battery cells, bipolar batteries, and related methods are disclosed. The disclosed bipolar plate comprises a composite of long carbon fibers and a filler of carbon particles and a fluoroelastomer. A fluoroelastomeric sealant for placement between adjacent cells is also disclosed.

16 Claims, 3 Drawing Sheets

BIPOLAR BATTERY CELLS, BATTERIES AND METHODS

This application is a continuation-in-part of my U.S. patent application Ser. No. 08/440,407, filed May 12, 1995, now abandoned, which is a division of U.S. patent application Ser. No. 08/321,692, filed Oct. 12, 1994, now abandoned.

FIELD OF THE INVENTION

The present invention relates generally to the field of batteries and more particularly to novel bipolar battery cells, bipolar batteries and related methods, which batteries overcome or substantially alleviate problems of the past and which provide long-term reliability, large energy storage capacity, and accommodate delivery of energy at very high power levels. As used herein, the term battery is intended to mean any self-contained source of electrical power.

BACKGROUND

The battery field is historically old. Secondary (rechargeable), multi-cell batteries are divided broadly into two types of configurations, i.e., (1) parallel plate batteries, such as are commonly used in automobiles for starting and lighting; and (2) bipolar batteries.

Each cell of a parallel plate battery comprises positive and negative electrodes, a porous separator to prevent the electrodes of opposite polarity from touching, and electrolyte. Each cell usually contains several positive plates connected to one another by a conductive strap, and several positive and negative plates are alternated.

The typical parallel plate battery comprises many individual cells. For example, the battery in automobiles typically have six cells. The cells are connected in series, such that the positive electrode from one cell connects through another conductive metal strap, to the negative electrode of the adjacent cell. The negative electrode from one "end" cell of the battery is the negative battery post, and the positive electrode from the other end cell is the positive battery post. Current flows through the battery from the negative post to the negative electrode of one end cell, through the electrolyte in that cell to the positive electrode, through the strap from that positive electrode to the negative electrode of the adjacent cell, and so on, exiting at the positive electrode of the other end cell at the end post. The battery voltage (potential) is the sum of the voltages from each individual cell.

The parallel plate battery has been used successfully for decades. It has the chief advantage of preventing leakage of electrolyte from one cell to the other. Its disadvantages, especially in respect to high specific energy and specific power, are:

1. Extra weight associated with the intercell straps;
2. Extra weight associated with the electrode grids, or the "skeleton" of the electrodes;
3. Comparatively large distances between the positive and negative electrodes within a given cell, which results in ohmic losses (i.e., losses of potential or voltage) as the current flows through the electrolyte in the cell;
4. Ohmic losses as the current travels through the electrode grids and intercell straps;
5. For some battery systems, excess electrolyte (which adds weight);
6. For some battery systems, uneven current distribution (i.e., more current per area flowing in the middle of the electrode plates than at the edges, or vide versa, a consequence of the geometry of the parallel plate cell design, which reduces the number of times the battery can be recharged).

On the other hand, a bipolar battery typically comprises a stack of bipolar electrodes, each prevented from touching the adjacent electrodes by a separator. Each separator holds electrolyte. Around the edges of the bipolar electrode, a seal is used to prevent the electrolyte from leaving the cell and to prevent shorts. The bipolar electrode traditionally comprises a thin, electronically conductive material known as the bipolar plate or bipolar electrode substrate, with the positive electrode active material applied to one side, and the negative electrode active material applied to the opposite side. On the ends of the bipolar battery are placed single-sided (monopolar) electrodes.

In general, the bipolar battery has several advantages over the parallel-plate battery design. First, the cumulative weight of several components is much less. Second, the efficiency of each cell is typically much higher, since it is possible to maintain a very small intercell gap (distance between facing electrodes) thereby minimizing internal losses. Well designed bipolar batteries offer peak specific powers which are often an order of magnitude (or more) higher than those of parallel plate batteries, and specific energies (W-hr/kg) can be higher for bipolar batteries.

In the early part of this century, battery manufacturers elected to use the parallel plate design as opposed to the bipolar design for greater reliability. Since then, periodic efforts have been made to develop secondary (rechargeable) bipolar batteries, mostly in response to certain applications particularly where high specific power was of principal concern. However, none of these efforts resulted in commercialization. There have been two apparently successful commercial (non-rechargeable) bipolar batteries, one by Polaroid (a four cell LeClanche battery for cameras) and one by Gould (in conjunction with Polaroid), a two cell lithium-manganese dioxide battery.

In the 1980's the Strategic Defense Initiative Organization was formed and began efforts to develop batteries which could deliver huge amounts of energy as sub-second pulses, to power certain defense systems (such as lasers). LaFollette and Bennion developed the design principles for bipolar lead acid batteries which provide high specific power. During recent years, other efforts have been made at high specific power bipolar battery development. The renewed electric vehicle development of the past four years, funded largely by the three U.S. automakers and the U.S. government, has also increased activity in bipolar battery development.

Notwithstanding bipolar battery efforts prior to the present invention, development of a rechargeable lightweight bipolar battery capable of storing large amounts of energy and of delivering energy at very high power levels has not been achieved.

BRIEF SUMMARY AND OBJECTS OF THE INVENTION

In brief summary, the present invention overcomes or substantially alleviates problems in the field of bipolar battery technology. Novel bipolar battery cells, bipolar batteries and related methods are provided. A unique bipolar plate, having exceptional characteristics, is provided. A novel technique for sealing individual bipolar cells is also provided.

The bipolar plate provides high electronic conductivity, is impervious to liquid penetration, is thin though possessed of sufficient mechanical strength and flexibility to withstand anticipated loads and abuses, is electrochemically and chemically inert, is capable of bonding effectively with the seal material and electrode active materials, and is possessed of low specific gravity.

The seal prevents contact between adjacent electrodes, prevents loss of electrolyte, is stable when in contact with the electrolyte, and forms a good bond with the edges of the electrodes.

Bipolar batteries embodying principles of the present invention can accommodate high specific power energy storage. Any desired voltage and power availability can be accommodated as can various configuration by which pulse or long-term discharge is accommodated.

With the foregoing in mind, it is a primary object to overcome or substantially alleviate problems associated in the past with bipolar battery cells, bipolar batteries and/or methods by which such cells and batteries are produced.

Another object of importance is the provision of a novel bipolar plate for bipolar cells and bipolar batteries, as well as unique related methods.

A further object of significance is the provision of a novel seal for bipolar cells and bipolar batteries, as well as unique related methods.

A further dominate object of the present invention is the provision of a novel bipolar plate material and methods by which the material is produced.

An additional valuable object is the provision of a bipolar plate which is strong, flexible, high conductive, chemically stable, adequately electrochemically inactive, ultrathin, and/ or of low specific gravity.

A paramount object is the provision of a novel peripheral bipolar seal comprised of fluoroelastomeric material which chemically bonds with the edges of the bipolar electrodes.

Another significantly important object is the provision of one or more of the following: a bipolar plate comprising one or more fluoroelastomers; a bipolar plate comprising carbon fibers; a bipolar plate comprised of glassy carbon; a bipolar plate comprising a backbone of overlapping carbon filaments or strands; a bipolar plate comprising matted carbon fibers; a structurally reliable bipolar plate comprised of a carbon backbone and carbon fluoroelastomer plate filler; a bipolar plate treated with organosilane; a bipolar carbon/ fluoroelastomer plate coated with tin dioxide; a bipolar battery comprising one or more carbon/fluoroelastomeric bipolar plates; a bipolar battery comprising a peripheral seal comprising an anti-leak fluoroelastomeric material; methodology for making reliable carbon/polymer bipolar plates having a long useful life expectancy.

A further object of value is provision of a bipolar battery which can accommodate high specific power energy storage.

Another object of importance is the provision of low weight bipolar batteries and battery cells.

An additional dominate object is the provision of novel bipolar batteries and battery cells wherein the current path therethrough is relatively short and internal losses are minimized.

Another object is the provision of bipolar battery technology which lowers the weight and volume of each cell.

An object of paramount value is provision of bipolar cells and bipolar batteries which accommodates use of either alkaline or acid electrolyte and which accommodates a wide range of voltage and power levels.

A further object of significance is the provision of novel bipolar cells and bipolar batteries which can be stored without use for long periods of time without significant deleterious effects and which provide a long service or cycle life.

An additional object of value is the provision of novel bipolar cells and batteries which are highly corrosion resistant over a protracted period of time and are also strong, flexible, and able to withstand various forms of abuse.

Also, an object of importance is the provision of bipolar cells and bipolar batteries, the useful life of which is very long because they are rechargeable.

Another object of note is the provision of a bipolar battery which comprises a combination of a bipolar plate, well adhered electrodes and a sealed periphery insuring superior long-term performance.

These and other objects and features of the present invention will be apparent from the detailed description taken with reference to the accompanying drawings.

DETAILED DESCRIPTION OF THE ILLUSTRATED EMBODIMENTS

General

Figure 2:
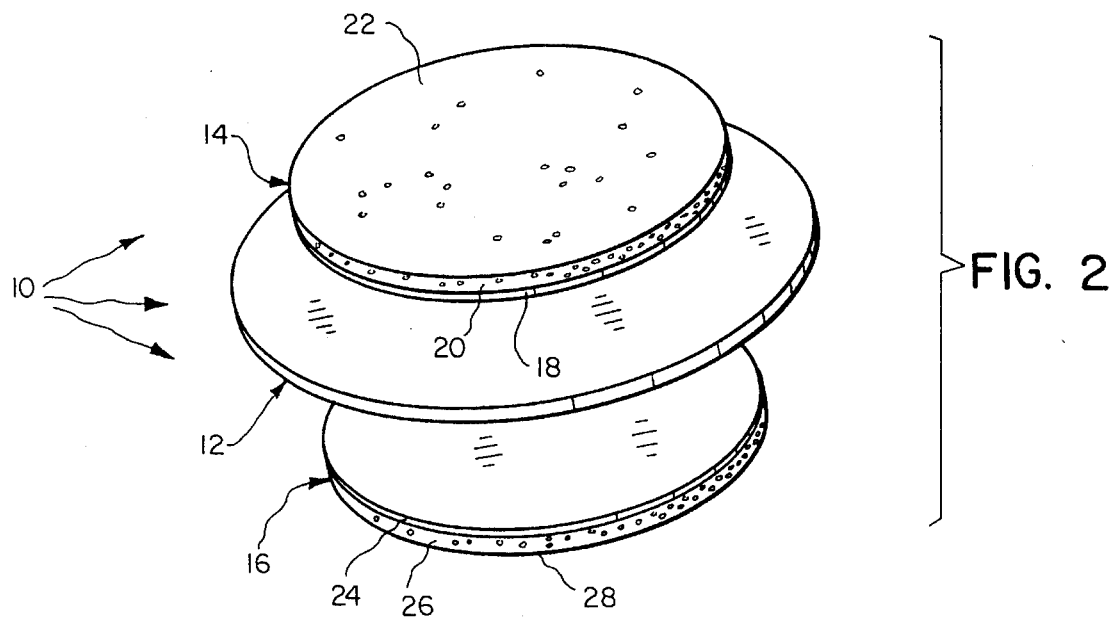
FIG. 2 is an exploded perspective of the bipolar battery cell of FIG. 1.

The two most difficult aspects of bipolar battery technology have been the bipolar plate and the seal of the individual cells. Needed or desired properties are not found in readily available plate or seal materials.

Lead metal has previously been used as a bipolar plate material. Lead has the advantages of inertness with respect to both oxygen evolution at the positive electrode and hydrogen evolution at the negative electrode, as well as most other undesirable battery reactions. It forms an excellent interface with the active material. The disadvantages include softness, high specific gravity and most serious of all, inadequate corrosion resistance over extended charge/discharge cycling.

Attempts have been made to use other metals, such as titanium, in the construction of a bipolar battery. Titanium is of low specific gravity, is mechanically strong, and can be made in ultrathin layers. Unfortunately, titanium is partially soluble in sulfuric acid electrolyte, and promotes the evolution of oxygen at the positive electrode. Further, adhesion of the active material to the plate can be difficult.

The use of tin dioxide as a protective coating for a bipolar plate has also been proposed.

Most other metals either promote oxygen evolution at the positive electrode, or are not stable in sulfuric acid.

Titanium suboxides have also been considered. Titanium suboxides are semiconductive. There is a range of these compositions (grouped in phases), some of which have quite high conductivity. Further, they are virtually inert, chemically and electrochemically. The main difficulty, which has caused titanium suboxides to be rejected for bipolar battery use, is in creating thin material which is not brittle, and in causing adhesion with the electrode active materials to the substrate.

Several composite materials have been proposed, which to one extent or another, combine desirable properties of two or more materials. Most are mixtures of carbon powder and a polymer. The advantages of these materials are ease of sealing the individual cells of the bipolar battery under some conditions, low specific gravity, and some electronic conductivity. The current flows through the carbon only, the polymers being insulators. If the carbon is not present in a high enough concentration to allow the individual carbon particles to be in contact with each other, as is typically the case, the carbon/polymer plate provides unacceptable conductivity. Conversely, the polymer must also be present in sufficient amount to ensure that voids between carbon particles are not present, to prevent pinholes and establish and maintain sufficient mechanical strength. A commercially acceptable balance between conductive and long-term polymer-induced strength in a bipolar plate formed of carbon powder and polymer has not been achieved adequate for high rate applications. The main problem is believed to be in disruptions in particle-to-particle contact of the carbon component. Other disadvantages of such carbon/polymer composites in the past include the difficulty of creating ultrathin, pinhole-free layers, brittleness, and oxidation of the polymer. Another serious problem with carbon powder/polymer composites is the ease with which oxygen evolution at the positive electrode occurs. This leads to build up of cell pressure and detachment of the electrode active material. Corrosion of carbon over time is also of concern, which undesirably leads to passage of electrolyte between cells as the solid carbon is consumed.

The novel bipolar plates of the present invention, unlike prior proposals, achieve the following significant advantages:

1. High electronic conductivity, i.e., electrical current is conducted between adjacent cells without significant loss of electrical potential because the conductivity is high and the resistance is low.

2. Impervious to liquid penetration, i.e., the electrolyte is not permitted to pass from one cell to another thereby preventing electrolytic shorts.

3. Ultrathin, i.e., the thickness is ultrathin whereby battery volume and weight are minimized, drop in potential is minimized.

4. High mechanical strength with flexibility, i.e., the integrity of each cell and battery are insured such that abusive conditions, such as overcharge, vibrations, and abrupt impact are inconsequential.

5. Electrochemical and chemical inertness, i.e., will not react with any of the other battery components, such as the electrolyte, electrode active materials, or seal material.

6. Capability of bonding effectively with the seal and the electrode, i.e., good electronic contact with the electrode is established and maintained so that cell resistance is kept to a minimum and a good interface with the seal material is provided to avoid leakage of electrolyte.

7. Low specific gravity (density), i.e., the weight of the battery is low because the specific gravity of the bipolar plate is low.

The peripheral seal is a critical element of a bipolar battery. The seal must be compatible with the bipolar plate, must function to prevent contact between adjacent electrodes, and prevent loss of electrolyte. In addition, seal must be inert, over the life of the cell or battery, to the electrolyte. A good bond must be formed between with the peripheral edges of the electrodes.

Epoxies are typically not a suitable seal, as they are not stable in sulfuric acid. Use of gaskets made from India rubber, and held in a bipolar stack under compression to avoid electrolyte from passing between the gaskets and the electrodes has been proposed. This material, when used with lead bipolar plates, works for short times, but over a period of months or years, the soft lead creeps. The continued application of pressure will allow for effective sealing even after the lead creeps, as long as the seals are absorbing the compressive pressure and not the electrode active regions (i.e., the battery core). For very high power designs, however, small intercell gap must be maintained. Only small changes in intercell gap can be tolerated. As the electrode edges (i.e., the seal region) grow thinner due to creep, excessive pressure applied to the battery core risks crushing of the electrode porous structure or other problems.

Numerous polymers have been proposed as a bipolar sealant. Polyethylene and polypropylene are effective when a carbon powder/polymer bipolar plate comprises unreliable polyethylene or polypropylene. These materials, as well as teflon (polytetrafluoroethylene), are inadequate due to recurring leakage between the bipolar plate and the seal.

The novel peripheral sealant of the present invention is compatible with the bipolar plate, serves to maintain requisite spacing between adjacent electrodes, prevents loss of electrolyte, is continuously inert to the electrolyte, and bonds excellently with the peripheral edges of the electrodes.

In one form of the present invention, long carbon fibers, arranged at random in a ultrathin mat configuration, provides the initial backbone for the bipolar plate. A commercially available mat of long carbon filaments can be used which has a void volume of approximately 90% by volume. Nevertheless, the carbon strands overlap and remain collectively contiguous both as the bipolar plate is fabricated and when the finished plate comprises part of a battery or battery cell. The long strands of carbon forming the mat may be rendered stable, individually and collectively by use of a phenolic binder, which leaves the mat stable in acid. The mat is diagrammatically represented in FIG. 5.

EXAMPLES

The carbon/fluoroelastomer mixture was prepared by first dissolving the fluoroelastomer polymer (which may be any of the FLUOREL® fluoroelastomers available from 3M) in a co-solvent of methanol and methyl isobutyl ketone. The carbon was then added, and the suspension was mechanically stirred. Finally, the mixture was ultrasonically blended to break up any carbon particle agglomerations and to provide for uniform solids distribution throughout the suspension. Both graphite powder (Union Carbide Grade 48), and glassy carbon (Johnson Matthey 38008, spherical powder, 0.4–12 um diameter, production temperature=2200° C.) were used. The solvent/fluoroelastomer ratio was typically 4:1.

Carbon fiber mat was obtained from Veratec Corporation. The carbon fibers were made with a phenolic resin binder to improve stability in acid environments. The mats (Veratec 8000020) consisted of long fibers which were laid upon one another somewhat randomly, as diagrammatically depicted in FIG. 5. Samples were provided in numerous sizes, from 0.50 opsy (ounce/yd$^2$; uncompressed thickness of 0.0075–0.010 cm) to 2.0 opsy (0.0370 cm thick). Only the thinnest samples (0.50 opsy) were used. The 0.50 opsy material was approximately 4–6 fibers thick.

Samples of the mat were cut into squares 8 cm×8 cm. A mat was then laid on a low porosity paper (Schleicher and Schuell B-2 weighing paper), and the carbon/fluoroelastomer suspension was loaded into the mat with a spatula, to the level of the top of the mat. The solvent was removed through evaporation. The loading procedure was repeated several times to fill the voids left by the solvent. The sample was then placed in a holder in a hydraulic press, and subjected to pressures of up to 5000 psi for an interval of at least ten minutes. After removal from the press, the sample was cured in nitrogen at 180° C. for ten minutes, to promote cross-linkage within the polymer phase.

An essential feature of a bipolar plate is the complete absence of pinholes. After visual inspection of the sample failed to reveal any pinholes, the sample was placed in an apparatus where one side of the material was contacted with liquid. If liquid was passed, the material was either discarded or patched.

After curing, the resulting thin sheet was then placed in container with KOH/H$_2$O (4M) and electrochemically oxidized for at least 15 minutes.

After rinsing the bipolar plate with deionized/distilled water, it was dried and quickly placed in a vessel for silanization. The vessel contained heptane (250 ml) and methyl trimethoxysilane (25 ml). The silanization reaction is run by heating the vessel and maintaining the temperature of associated condensers such that any heptane which boils returns to the vessel, while the methanol, dimethyl ether, and any other volatile or gaseous species are removed. The bipolar plate (sometimes also known as the bipolar electrode substrate), being complete, was immediately subjected to electrode plating in the manner described below.

Lead plating onto the bipolar plate was accomplished using a fluoborate bath (Bode, 1977). The plating was done at room temperature, and at a current density of less than 10 mA/cm$^2$. Deposits of 0.002 cm were typical.

The Plante process was used to create a porous active mass at the exposed extension portion of the lead electrodeposit. The formation solution was 0.5M KClO$_4$, 0.5M H$_2$SO$_4$ in H$_2$O, and the oxidation current density used was 2–3 mA/cm$^2$. Experience showed that care had to be exercised to keep the potential of the electrode under 1.80 V (vs. a calomel reference), to avoid excessive oxygen evolution and possible subsequent loss of active material; therefore, in some situations, current densities were lower than 2 mA/cm$^2$. The formation was accomplished by first oxidizing the lead for one hour, then reversing the current to form pure (porous) lead, and then removing the formation solution by carefully and repeatedly rinsing the electrodes. This procedure resulted in a suitable negative electrode. The lead was oxidized for several hours in aqueous sulfuric acid (without potassium perchlorate) to form porous lead dioxide. Bipolar electrodes were created by electrodepositing lead on both sides of the bipolar plate, and then creating a positive electrode active region on one side, and a negative electrode mass on the other side.

Bipolar batteries were made by using monopolar electrodes (one positive and one negative), and the appropriate number of bipolar electrodes sandwiched in between the monopolar electrodes, with a cellulose-based separator between adjacent electrodes. Prior to use, all electrodes (positive and negative) were partially discharged to a common point, typically 1 C/cm$^2$. A separator (0.0025 cm wet thickness) large enough to cover both the electrode active area and the surrounding seal region, was placed over both the electrode active region and the edge of the electrode (i.e., the sealing region; see FIG. 4). The separator was placed over the electrode wet, to prevent expansion which occurred on wetting.

Figure 4:
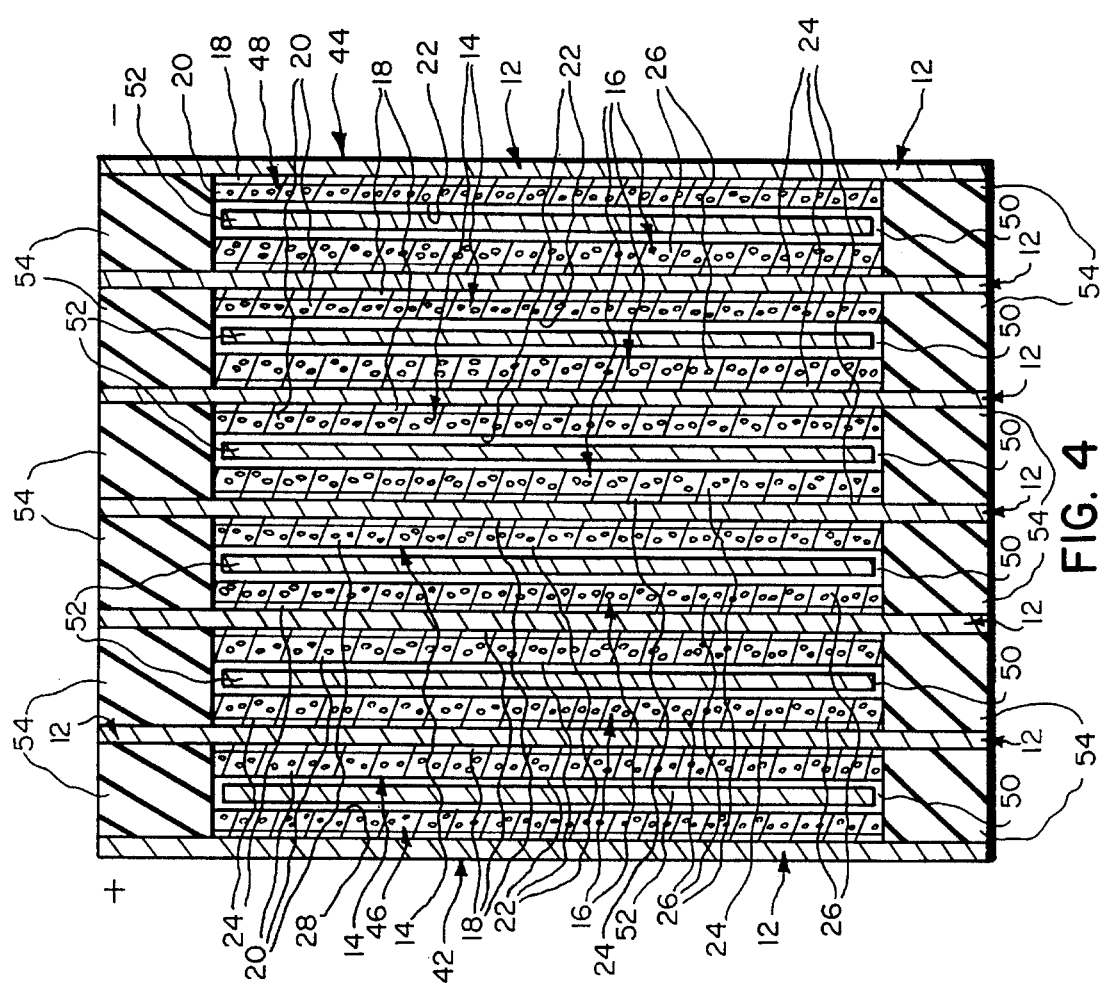
FIG. 4 is a cross-sectional schematic of a bipolar battery comprising a series of bipolar battery cells of the type illustrated in FIG. 1.

Both cellulose-based separators (such as various papers) or fiberglass separators can be used between adjacent electrodes in an electrolyte bath, as well as other materials. Each separator is held in place by contact with the electrodes, even though spaces are shown in FIG. 4 to improve clarity. Each separator is cut to match the dimensions of the electrode active material, placed over one of the electrodes, and then the facing electrode is placed next to the separator, as the battery is assembled. The electrolyte is added either before or after final assembly and placement of the sealant.

If desired, each separator can extend into the seal (surrounding the electrode active material region). When a seal is made, sometimes a gasket made from the appropriate seal material (in this case fluoroelastomer is used), with the seal material having been previously applied to the bipolar plate edges. The gasket is then placed between adjacent electrodes as previously described. The gasket may be made by filling some thin structure, such as a porous paper, with the polymer. The structure allows careful definition of the gasket thickness. For example, if a gasket of 0.002 inches is desired, a porous paper of 0.002 inches thickness is cut to the appropriate shape, and the paper is filled with the fluoroelastomer. After drying the gasket can be used. If, however, a cell separator is used which extends out from the active material region into the seal area, that part of the separator which is in the seal region is filled with the fluoroelastomer material, so that the gasket is but an extension of the separator itself.

A viscous fluoroelastomer solution (without the addition of carbon) was placed around the edge of the electrode, soaking through the paper to the edge of the electrode underneath. A temporary capillary was left through the seal region for filling the cell. Care was exercised so that the fluoroelastomer did not spread from the seal region where it was initially applied, into the inner part of the cell, which would block part of the electrode. When the fluoroelastomer solution was still tacky (i.e., before all solvent was completely removed), the adjacent (facing) electrode was placed over the electrode, so that the fluoroelastomer on the seal area also contacted the adjacent electrode. This process was repeated for each cell in the battery. The solvent was allowed to completely evaporate, and heat was applied to the edges of the battery to cure the fluoroelastomer. Finally, the cells were filled with electrolyte, the battery was compressed, and the capillaries were removed.

Cells were tested for their performance in test hardware specially designed for high current application. Performance data were recorded using a GW Instruments MacAdios A/D board, installed in a Macintosh II computer.

Some of the material tests involved the use of cyclic voltammetry. The sample was inserted into a 1000 ml Berzellius beaker containing electrolytically purified sulfuric acid (5M). A calomel reference was placed in the solution close to the sample. A pure lead counter electrode (99.9% pure) was used. A PAR 362 scanning potentiostat was used to control the potential, and the samples were scanned potentiostatically. All data shown are IR-corrected (unless noted). Scan rates were 50 mV/second, unless otherwise specified.

The electronic conductivity of bipolar plate, both with and without the presence of the backbone was tested. The reinforcing fibers or backbone material (comprising the mat) was prepared as discussed earlier, without the silanization treatment. Strips (1 cm×8 cm) were cut for measurement of conductivity. Similar strips were cut from material not containing the mat. The conductivity was measured using the four electrode technique, at room temperature. Samples of both types were prepared with various carbon loadings, over a range thought to bracket the practical region of interest.

Similar samples were also tested for rupture strength. An apparatus, shown in FIG. 5, was used to test this property. Material strips were held carefully at either end, and increasing amounts of force applied to one end to create a tensile stress. The amount of force that resulted in material rupture was recorded. If it was apparent that the break occurred at the point at which the material was clamped on either end, then the test was repeated so that there could be confidence that the rupture had not occurred due to improper clamping.

The specific gravity was measured simply by weighing the mass of a sample and then determining the volume displacement in a container of isopropanol. The specific gravity of the composite materials turned out to correlate with the arithmetic average of the specific gravity of the carbon and fluoroelastomer, so that the density could be calculated from the relative quantities of the ingredients used. The specific gravity of both the carbon and the fluoroelastomer was 1.80–1.84 g/cm$^3$, so that a value of 1.82 g/cm$^3$ was used in all calculations.

The supported materials were more than an order of magnitude increase in conductivity above the unsupported material. The carbon fibers are believed to be the major conducting phase. Conductivities of over 10 $\Omega^{-1}$cm$^{-1}$ were achieved in every case. A current density of 10 A/cm$^2$ could be sustained with a potential loss of only 1 V/cm.

Conductivity tests were also done with samples with a silanized surface. The results (not shown) were comparable to those from samples without the silanized surface. Thus, it appears that the silane treatment did not provide any significant addition to electronic resistance of the material.

Even the weakest material, with the highest carbon loadings, had a rupture strength above the range likely to be encountered in a sealed battery. The presence of the polymer phase enhanced the strength of the carbon fiber mat, for high polymer volume fraction. The fluoroelastomer obtained from 3M Corporation, and used for this study, contained a small amount of carbon (15%) as a filler. Thus, the carbon loadings shown represent the sum of this carbon and any additional carbon that was added.

It can be concluded from these data that the material possesses sufficient mechanical strength, even in very thin layers, for reliable use in a bipolar battery. The data also show that the fluoroelastomer has sufficient strength and other characteristics for use as a seal material, even should high pressures develop within a cell. No material degradation of the polymer occurred. The glassy carbon, due to its chemically stable surface and low surface area, significantly improved the electrochemical performance of the composite material. Further, the electrochemical improvement of the glassy carbon/fluoroelastomer composites (over materials with graphite or other carbons) does not come at the expense of conductivity. Oxygen evolution is suppressed with the use of silane treatment. The magnitudes of current densities is significant.

Batteries comprising the above-described bipolar plates and electrodes were built and tested. The sealing technique described proved to be completely effective. No shorts were observed when the separator is allowed to extend slightly outside the perimeter of the electrodes.

Several other batteries (5–20 cm$^2$) were built using lead foil electrode substrates, to determine how long the high power outputs could be sustained, and how many pulses could be obtained. Pulses of at least 3 ms can be sustained at power outputs of over 10 W/cm$^2$. Numerous high power pulses are possible without a significant recharge. For example, the fifth such pulse delivered an average power of 8 W/cm$^2$. A small rest period, 22 ms, was chosen because of instrumentation limitations. The open circuit potential recovers after each pulse, but the recovery time increases with successive pulses. This suggests that acid diffusion is occurring during the rest. The implication is that even more high power pulses are possible, if a longer rest period is used, allowing time for the acid to move from the separator region into the electrodes. It also suggests that acid availability may be a limiting factor in the useful length of high power pulses.

In an alternative approach, the carbon fiber mat/carbon powder/fluoroelastomer bipolar material was prepared as described above. The silanization of the surface was done. Then, a slurry of lead powder (−325 mesh; Aldrich Chemical) in fluoroelastomer solution was used to coat each side of the bipolar plate. After solvent removal, the material was subjected to mild pressure. Since the lead was softer than the polymer, it was easily flattened. The lead deposition and the rest of the electrode process was then done as described above.

There are two benefits of this approach. First, there is no carbon exposed to the electrolyte. The only conductive material initially exposed to the electrolyte is lead metal. Thus, the silanized carbon surface is protected from any degradation which might have occurred. Second, the adhesion of the electrodeposited lead to the bipolar plate is enhanced. Although the lead in the fluoroelastomer/lead surface might be subjected to eventual corrosive attach, the process is slow. Even if electrolyte eventually is able to reach the silanized carbon surface, this surface significantly inhibits corrosion and oxygen evolution. The lead/fluoroelastomer thus significantly extends the cycle life and shelf life of bipolar lead acid batteries. If the lead/polymer layer is kept very thin, then the weight and thickness of the bipolar plate are not substantially increased.

Description of the Figures

Figure 1:
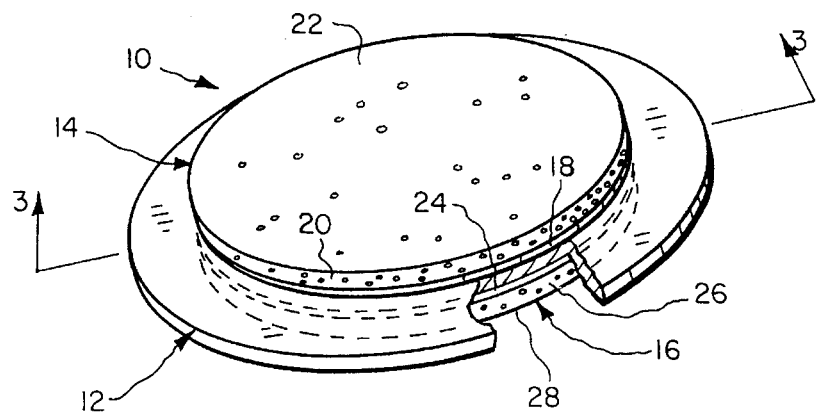
FIG. 1 is a perspective representation of a bipolar battery cell embodying principles of the present invention.
Figure 3:
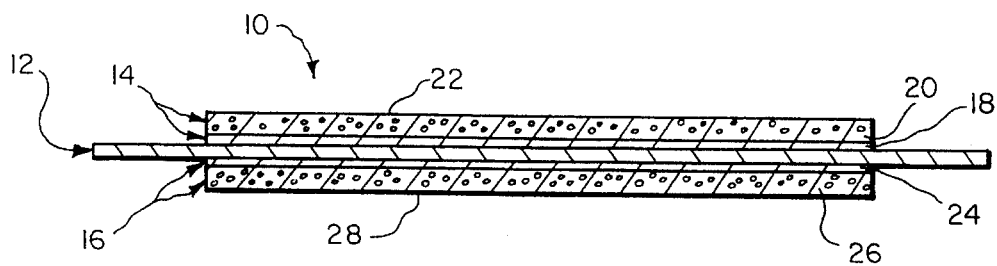
FIG. 3 is a cross-section taken along lines 3—3 of FIG. 1.
Figure 6:
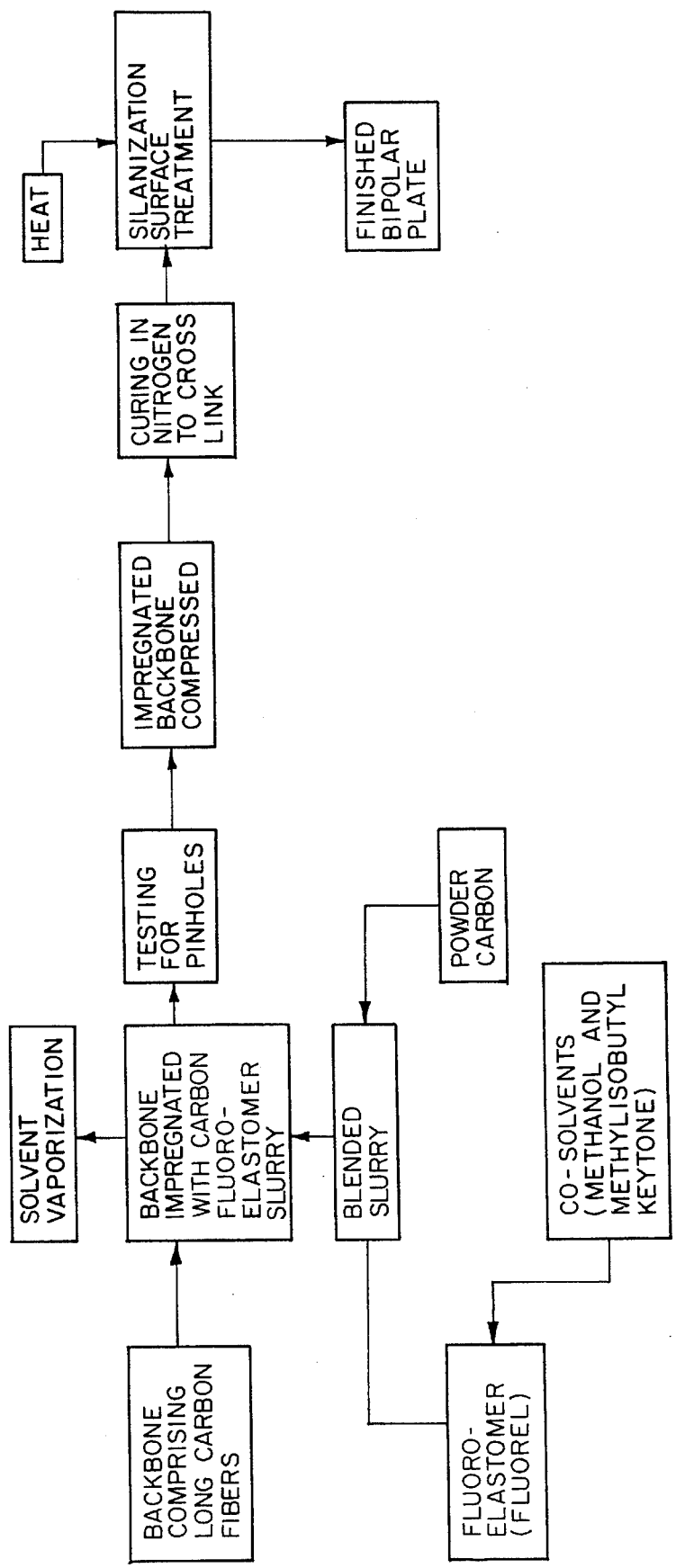
FIG. 6 is a flow chart of one way of forming a bipolar plate in accordance with the principles of the present invention.

Reference is now made to the drawings, wherein like numerals are used to designate like parts through. FIGS. 1–3 illustrate a bipolar cell, generally designated 10, embodying principles of the present invention. As can be seen from inspection of FIGS. 1–3, the fundamental construction of bipolar cell 10 is one of lamination, achieved in the manner described above. Bipolar cell 10 comprises an ultrathin bipolar plate or semiconductive substrate, generally designated 12, shown as being disc-shaped in its configuration, although other shapes could be used as appropriate and desirable. The diameter of bipolar plate 12 is of a predetermined amount, which exceeds the diameter of other components forming a part of bipolar cell 10. Bipolar disc or plate 12 is formed in the manner described above, the flow chart for which appears in FIG. 6, so as to comprise a backbone of randomly oriented overlapping carbon fibers, strands, or filaments the voids of which are impregnated with a mix of carbon and fluoroelastomer which cures to form a composite membrane-like plate.

The composite bipolar cell 10 also comprises first and second, opposed electrodes respectively designated 14 and 16. One electrode functions as a positive electrode and the other as a negative electrode. Each disc-shaped electrode (14 and 16) is formed as one piece, but comprises two distinct layers or strata. Each electrode is electroplated generally concentrically directly upon and is, therefore, contiguous with a circular surface of the plate 12 in such a way as to ensure long-term adherence using the above-described methodology. More specifically, electrode 14 has a diameter substantially smaller than the diameter of bipolar plate 12 and comprises a first layer 18 comprising deposited lead, contiguous with and adhered to one surface of the plate 12, and an outer layer 20 comprising a porous lead dioxide, formed in the manner described above. Electrode 14 comprises an exposed, generally circular surface 22 which, when comprising a portion of a bipolar battery, is in direct contact with electrolyte.

Similarly, disc-shaped electrode 16 comprises a diameter substantially less than the diameter of the plate 12 and is generally concentrically aligned with the disc 12. Electrode 16 is formed as one piece, but comprises two layers or strata, i.e., an inner layer 24 comprising deposited lead, the interior surface of which is contiguously adhered to the associated surface of the plate 12, and an outer disc-shaped layer comprising porous lead, formed using the above-described methodology.

While the bipolar cell is illustrated in FIG. 2 in exploded perspective, the components, i.e., plate 12 and electrodes 14 and 16, are inseparable in their manufactured state. Thus, FIG. 1, although the dimensions are exaggerated for clarity of illustration, represents the manufactured configuration of the bipolar cell 10. The exposed generally circular surface 28 of the electrode 16 is in direct contact with electrolyte when cell 10 comprises part of a bipolar battery.

Figure 5:
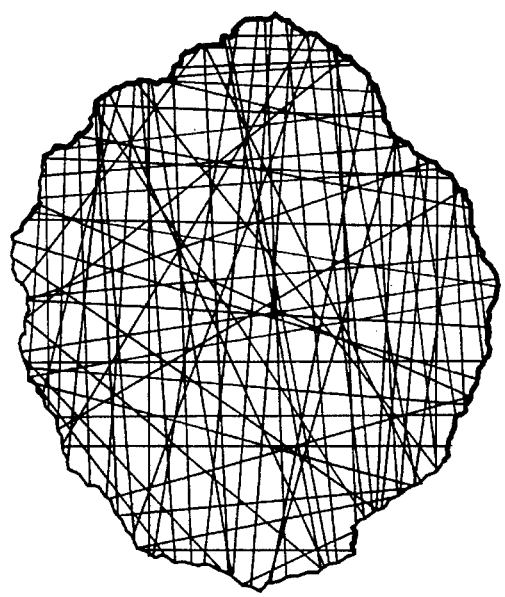
FIG. 5 is an enlarged diagrammatic representation of the long carbon fiber backbone from which the bipolar plate of this invention is formed.

The nature of the carbon backbone comprising its long carbon strands is diagrammatically illustrated in FIG. 5.

Reference is now made to FIG. 4 which illustrates the manner in which bipolar cells 10 are combined sequentially to form a bipolar battery, generally designated 40. Each bipolar cell 10 and the components thereof are identified in FIG. 4 as those used in FIGS. 1–3, and no further description thereof is necessary at this point for one skilled in the art. In addition, bipolar battery 40 comprises positive and negative monopolar terminal cells, generally designated 42 and 44, respectively. Each monopolar cell 42 and 44 comprises, as illustrated, an exposed bipolar plate 12, as earlier described and a monopolar electrode, generally designated 46 and 48, respectively. Electrode 46 is identical to the previously described electrode 16, while the electrode 48 is identical to the previously described electrode 14. Accordingly, the portions of the electrode 46 and 48 are numbered in FIG. 4 so as to correspond with the numbers used for the electrode parts in FIGS. 1–3.

Between each cell of which battery 40 is comprised, is disposed an electrolyte reservoir 50 of ultrathin dimensions. Disposed in each electrolyte reservoir 50 is a thin planar separator 52, which may be formed of cellulose material and which functions to prevent adjacent electrodes from coming in contact with each other.

An annular, peripherally located cured fluoroelastomeric seal 54 spans between each adjacent pair of bipolar plates 12 in hermetically sealed relation, which in turn seals each electrolyte reservoir 50 against leakage. Each annular fluoroelastomeric seal 54 is formed as described above and accomplishes the objectives heretofore mentioned.

Summary, Conclusions, and Benefits

In partial summary, the above-mentioned work produced bipolar plates possessed all of the desirable properties mentioned above. A thin carbon fiber mat, which is approximately 90% void volume, is impregnated with a slurry consisting of carbon powder and fluoroelastomer. The surface of the material is then treated in any of several ways (such as application of an organosilane surface or coating the surface with tin dioxide) to reduce electrochemical activity of that surface, while still maintaining electronic conductivity. In this manner, oxygen evolution within the cell is significantly reduced. The resulting material is strong, flexible, highly conductive, chemically stable, quite electrochemically inactive, and can be made into layers which are $\leq 0.01$ cm in thickness. Further, the specific gravity of the material is significantly lower than metals, approximately 1.8 g/cm$^3$.

Typical preparation procedures are recited below. The fluoroelastomer material (any of the FLUOREL® fluoroelastomers from 3M may be used) is dissolved in an alcohol/ketone cosolvent. A suitable fluoroelastomer is any of the FLUOREL® fluoroelastomers available from 3M. FLUOREL® designates commercially available fluoroelastomers used in injection molding, transfer molding, compression molding, extrusion, and other polymer forming applications. These fluoroelastomers come in a range of viscosities and other chemical and mechanical properties to allow a practitioner skilled in the an to choose a polymer suitable for the particular processing and manufacturing equipment used. While all of the FLUOREL® fluoroelastomers are suitable for the bipolar plates of the present invention, it is within the skill of an artisan to pick the particular fluoroelastomer to optimize the desired properties of the bipolar plate. For example, certain of the fluoroelastomers are described as having enhanced stability in extreme chemical environments, having superior elongation retention after thermal aging and having a superior chemical and acid resistance. In the table below are shown descriptions of various FLUOREL® fluoroelastomers which may be used with the present invention, as disclosed in data sheets currently available from 3M Corporation.

TABLE A

FLUOREL® FLUOROELASTOMERS

FLUOREL® Fluoroelastomer Product Information Index

FLUOREL® Fluoroelastomers are highly fluorinated synthetic elastomers developed by 3M for long service under severe temperature and chemical conditions. Their composition and molecular weight are carefully controlled to combine easy processing with high mechanical strength, fuel and solvent resistance, and thermal stability. In addition to these properties, their non-flammability and resistance to oxidation, ozone and weathering make them especially applicable to advancing technologies in the aerospace, automotive, pollution control and chemical industries.

FLUOREL® Fluoroelastomers are sold as raw polymers to the rubber fabricating industry by the Commercial Chemicals Division of 3M. 3M does not manufacture molded fluoroelastomer products.

The FLUOREL® Fluoroelastomers described in this book are as follows:

FLUOREL® Fluoroelastomers: Incorporated Cure Polymers for O-Rings

FLUOREL® FC 2121

A low viscosity fluoroelastomer designed for injection molding of sealing components that meet the major fluoroelastomer O-ring specifications. FLUOREL® FC 2121 exhibits excellent processability, improved mold release characteristics and ultra-fast cure cycles (30 seconds@400° F. (204° C.)).

FLUOREL® FC 2170

A fluoroelastomer designed to provide excellent processing safety, excellent compression set resistance, low compound viscosity, and good scorch resistance while maintaining fast cure rates. In addition, it meets AMS-7259, AMS-7280, MIL-R-83248-Amendment 2-Type 1, and MIL-R-25897, Type 1* O-ring specifications.

FLUOREL® FC 2174

A fluoroelastomer designed to provide excellent processing safety, ultrafast cure cycles, improved mold release characteristics, low compression set and high tensile strength necessary to meet the critical major O-ring specifications of AMS-7259, AMS-7280, AMS-7276B, and MIL-R-83248 Amendment 2-Type 1.

FLUOREL® FC 2179

A high viscosity fluoroelastomer that provides maximum compression set resistance. It has excellent processability for a high molecular weight polymer. FLUOREL® FC 2179 is recommended for high pressure, severe environment applications.

FLUOREL® FC 2180

A medium viscosity fluoroelastomer similar to FLUOREL® FC 2174 but designed to have less mold shrinkage. FLUOREL® FC 2180 possesses superior processing safety, good mold release and excellent compression set resistance.

FLUOREL® Fluoroelastomers: Incorporated Cure Polymers for Molded Goods

FLUOREL® FC 2122

A low viscosity fluoroelastomer designed for injection molding of elastomeric molded goods items. The inate mold flow and release, in addition to hot tear characteristics of FLUOREL® 2122 have been optimized for injection molding of elastomeric articles with complex geometric profiles.

FLUOREL® FC 2123

A low viscosity fluoroelastomer designed for injection and transfer molding of custom molded shapes. FLUOREL® FC 2123 has excellent hot tear properties that are essential for molding elastomeric articles with complex geometric profiles. In addition, FLUOREL® FC 2123 has excellent resistance to compression set.

FLUOREL® FC 2152

A medium viscosity fluoroelastomer designed with a high tear strength and elongation to allow demolding of molded goods with complex shapes. As a result, reject rates due to part tearing can be sharply reduced. FLUOREL® FC 2173

A low viscosity fluoroelastomer offering greatly improved mold release and mold flow without the usual sacrifice in physical properties associated with higher levels of process aids. It exhibits essentially the same cured physical properties as FLUOREL® FC 2170, FLUOREL® FC 2173 can be used alone or can be blended with other FLUOREL® fluoroelastomers to improve their mold release and flow.

FLUOREL® FC 2176

A fluoroelastomer that is specifically designed for molded goods applications. It offers fast cure cycles with excellent processing safety for injection, compression and transfer molding operations. It offers incorporated mold release, good compression set resistance and high elongation at elevated temperatures to facilitate demolding without tearing.

FLUOREL® FC 2181

A fluoroelastomer that combines high elongation for ease in demolding complex parts with exceptionally good compression set resistance. With a viscosity slightly higher than conventional molded goods fluoroelastomers, FLUOREL® FC 2181 offers improved mold release and is less susceptible to air entrapment.

Since FLUOREL® FC 2181 shares the ultrafast cure rate, processing safety, and improved mold release of FLUOREL® FC 2174, it is also an excellent choice for low compression set O-ring cord.

FLUOREL®FLS 2330

A higher fluorine content (69% by weight) fluoroelastomer that offers improved chemical resistance, high elongation and good tear strength. The concept behind FLUOREL®FLS 2330 has been to combine these improvements with the processing advantages previously designed in our other molded good polymers. FLUOREL® FLS 2330 is recommended for molded goods designed to operate in extreme chemical environments.

FLUOREL® Fluoroelastomers: Incorporated Cure Polymers for Bonded Seal Applications

FLUOREL® FC 2177

A fluoroelastomer for molded goods applications with a slower cure rate, higher compression set and better bondability to metal than FLUOREL® FC 2176. It features the high elongation and good tear strength required for easy pan removal from hot molds.

FLUOREL® Fluoroelastomers: Incorporated Cure Polymers for Extrusion Applications

FLUOREL® FC 2120

A low viscosity fluoroelastomer optimized for scorch safety and improved flow characteristics. Excellent for use in difficult extrusion operations and also is an excellent choice for injection or transfer molding applications, Meets major automotive fuel hose specifications.

FLUOREL® FC 2182

A fluoroelastomer polymer that has been optimized for scorch safety and the development of excellent physical properties at lower curing temperatures (e.g. 290°–300° F.). This makes FLUOREL® FC 2182 ideally suited for extrusion applications such as hose, thin-wall tubing and profiles. It is also an excellent choice for injection or transfer molding applications where exceptionally good mold flow, high elongation and good tear strength are required.

FLUOREL® FT 2320

A low viscosity fluoroelastomer containing a higher level of fluorine (approximately 67%, by weight) which contributes to improved retention of elongation after long-term heat aging. The lower viscosity of FLUOREL® FT 2320 enables this material to be processed on extrusion and transfer molding equipment.

FLUOREL® Fluoroelastomers: Incorporated Cure Polymers for Reinforced Composite Applications

FLUOREL® FT 2350

A fluoroelastomer containing a higher level of fluorine (67% by weight) which contributes to improved retention of elongation after long-term heat aging and improved chemical and acid resistance compared to conventional fluoroelastomers. These properties lend themselves to meeting the thermal and acid resistance requirements of flue gas desulfurization systems.

FLUOREL® Fluoroelastomers: Raw Gums Without Curatives

FLUOREL® FC 2145

A low viscosity fluoroelastomer gum that allows the fabricator to modify and blend different grades of FLUOREL® fluoroelastomers to achieve a broader range of processing and property characteristics. FLUOREL® FC 2145 can also be used as the base polymer in fluoroelastomer compounds cured with commercially available vulcanizing agents (e.g, diamines, bisphenols).

FLUOREL® FC 2230

A medium viscosity fluoroelastomer gum which mills easily, calendars well, and can be extruded. FLUOREL® FC 2230 is mine or bisphenol curable. Conforms with FDA 21 CFR 177.2600 (c) (4) (1).

FLUOREL® FC 2178

A high viscosity fluoroelastomer gumstock providing flexibility in the choice of curing systems for differing applications. Blend with incorporated cure grades to increase viscosity and green strength. Conforms with FDA 21 CFR 177.2600 (c) (4) (1).

FLUOREL® FC 2260

A medium to high viscosity peroxide curable fluoroelastomer gum specifically designed to be used in covulcanizable blends with fluorosilicone or other synthetic elastomers to obtain products with a unique combination of physical properties, heat and fluid resistance, and low temperature characteristics, This feature makes compounds based on FLUOREL® FC 2260 extremely attractive in automotive applications.

FLUOREL® FT 2430

A low viscosity fluoroelastomer gumstock designed for improved retention of elongation after long-term heat aging, improved resistance to volume swell by organic solvents, and improved acid resistance. The low viscosity enables this material to be processed on extrusion and transfer molding equipment.

FLUOREL® FT 2481

A medium to high viscosity terpolymer gumstock designed for improved retention of elongation after long-term heat aging, improved acid resistance, and improved resistance to volume swell by organic solvents. FLUOREL® FT 2481 is amine or bisphenol curable.

FLUOREL® FLS 2690

A low fluid swell, high fluorine (69% by weight) tetrapolymer gumstock that can be vulcanized by peroxide, bisphenols, or diamines. Compounds made from FLUOREL® FLS 2690 show excellent resistance to methanol and methanol containing fuel blends and other aggressive fluid environments.

FLUOREL® Fluoroelastomers: Masterbatch Polymers

FLUOREL® FC 2172

A fluoroelastomer "masterbatch" of cure accelerators designed to be used with FLUOREL® incorporated cure polymers to accelerate the cure rate at both low and high temperatures.

After dissolving the fluoroelastomer material in the cosolvent, the carbon powder is then added to the mixture, and the resulting slurry is stirred, either mechanically or ultrasonically. The slurry then is loaded into the carbon fiber mat, which has been laid on a flat surface. The solvent is removed, usually by evaporation. A new application of the carbon/fluoroelastomer slurry is done, and the process can be repeated as often as necessary to ensure adequate amounts of the material throughout the carbon fiber mat structure. After removal of the solvent, the material is then held in compression (for example, in a hydraulic press) for several minutes at high pressure, at least 100 psi. After removal from the press, the material is then cured by heating to 180° C. in an inert (nitrogen, argon, etc.) atmosphere). Curing can also be done in the open air, although some of the carbon on the surface will be oxidized in the process. Finally, the semiconductive layer is deposited on the surface. Preferably, that layer has been subjected to an organosilane surface treatment. This is done typically by immersing the material in a solution of heptane and methyltrimethoxysilane and heating. The resulting surface is quite electrochemically inert, raising the potential at which oxygen evolution occurs by at least 200 mV.

Each of the parts of this material has an important function. The carbon backbone contributes several desirable properties. It comprises long (≧1 cm), thin (~0.002 cm) carbon fibers (which can be created by decomposing fibers of rayon, phenolic resin, polyacrylontrile, or other materials), which are superimposed upon one another. The use of this backbone significantly enhances the electronic conductivity, sometimes up to 20 times. It increased the mechanical strength (rupture strength) by an order of magnitude. It makes the formation of very thin layers easier to accomplish, as it serves as a skeleton of sorts for the bipolar plate. When a phenolic binder is used the backbone is stable in acid.

The fluoroelastomer of the admix also contributes valuable properties. The fluoroelastomer material is strong and flexible as well. This allows higher carbon loadings than are possible with polyethylene or polypropylene, which enhances the conductivity of the fluoroelastomeric/carbon powder phase of the bipolar plate. Perhaps the most attractive feature is the ease with which a seal is accomplished. When the fluoroelastomer (of course without the carbon powder added) is used as the seal material, a chemical bond between the electrode edges and the seal occurs, resulting in a highly reliable, long-term seal. The fluoroelastomeric seal is impervious to liquid or gas penetration.

Several carbon powders were used. The most successful was glassy carbon, due to its low internal surface area (and hence low electrochemical activity).

The deficiencies in past materials were largely overcome. These deficiencies were excessive activity for oxygen evolution at the potentials of the positive electrode, low conductivity, poor mechanical strength, excessive thickness, and in some cases inadequate bonding with the electrode active material and/or the seal material. The use of a carbon strand backbone for mechanical strength, enhanced conductivity, and reduced material thickness is a major contribution of the present invention. The use of glassy carbon in the filler additive reduced electrochemical activity. The treatment of the surface of the bipolar plate using silanization decreased electrochemical activity. Use of a fluoroelastomer material in the filler additive increased chemical stability, improved flexibility, and reduced material thickness.

The carbon backbone causes an increase in electronic conductivity.

The carbon/fluoroelastomer bipolar plates are ultrathin, are pinhole-free, have a low density and possess excellent flexibility and mechanical strength.

Uniform lead electrodeposits on the bipolar plates were achieved and porous electrode active material layers of high uniformity and high surface area were produced.

The use of glassy carbon lowered the electrochemical activity of the bipolar plate significantly when compared to other materials containing graphitic powder, resulting in benefits over previous carbon/polymer materials.

The silanization process proved effective in suppressing electrochemical activity of the bipolar plate. The evolution of oxygen due to electrolyte decomposition, which takes place at the positive electrode in a lead acid battery, and has been a major problem with previous carbon/polymer is significantly suppressed. The application of this process to a fluoroelastomer/carbon composite, not previously undertaken or proposed, proved successful. Silanization of both graphitic and glassy carbon composites was done. Endurance testing of silane-treated bipolar plate materials showed that a very low level of electrochemical activity can be maintained over at least the equivalent of 250 hours of battery operation. Cyclic voltammetry revealed no evidence of faradaic degradation of the silane-treated surface at high potentials.

Cyclic voltammetry failed to reveal any evidence of decomposition of the fluoroelastomer in sulfuric acid, at either high or low potentials.

The use of the backbone/carbon/fluoroelastomer bipolar plate, in conjunction with a fluoroelastomer seal, results in a superb seal of the individual bipolar cells.

The invention may be embodied in other specific forms without departing from the spirit of essential characteristics thereof. The present embodiments therefore to be considered in all respects as illustrative and are not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A bipolar cell comprising:
   a bipolar substrate plate comprised of serially conductive contiguous strands of carbon and a cured filler comprised of a cured mix comprising carbon particles and a fluoroelastomeric material the plate comprising two opposed generally flat surfaces;
   an electrode integrally inseparably and conductively joined to each of the two plate surfaces.

2. A bipolar cell according to claim 1 wherein the overlapping carbon strands are bound together.

3. A bipolar cell according to claim 2 wherein the overlapping carbon strands are bound together by a binder comprising a cured phenolic resin.

4. A bipolar cell according to claim 1 wherein the carbon particles comprises carbon powder.

5. A bipolar cell according to claim 4 wherein the carbon powder comprises glassy carbon.

6. A bipolar cell according to claim 1 wherein the fluoroelastomeric material is cross-linked.

7. A bipolar cell comprising:
   a bipolar substrate plate comprised of serially conductive contiguous strands of carbon and a cured filler comprised of a cured mix comprising carbon particles and a fluoroelastomeric material, the plate comprising two generally flat opposed silane-treated surfaces,
   an electrode integrally inseparably and conductively joined to each of the two plate surfaces.

8. A bipolar cell according to claim 1 wherein each electrode comprises lead.

9. A bipolar cell according to claim 8 wherein the lead of each electrode is formed into an inner layer of pure lead contiguous with the electrode and an outer layer comprising treated lead.

10. A bipolar cell according to claim 9 wherein one inner layer comprises porous lead and the other layer porous lead dioxide.

11. A bipolar cell according to claim 1 wherein at least some of an exterior of the plate is coated with tin dioxide.

12. A bipolar cell according to claim 1 wherein an exposed surface of each electrode comprises a silane-treated surface.

13. In a bipolar battery comprising bipolar cells wherein the improvement comprises each cell comprising a bipolar plate comprising cured fluoroelastomeric material, a peripheral seal comprised of cured fluoroelastomeric material imperviously peripherally bonded to and between adjacent bipolar plates.

14. A bipolar battery comprising:

a plurality of bipolar cells, each bipolar cell comprising a bipolar substrate plate comprised of serially conductive contiguous strands of carbon and a cured filler comprised of a cured mix comprising carbon particles and a fluoroelastomeric material, the plate comprising two opposed generally flat surfaces and an electrode integrally inseparably and conductively joined to each of the two plate surfaces;

a peripheral seal comprised of cured fluoroelastomeric material imperviously peripherally bonded to and disposed between at least two adjacent bipolar plates;

an electrolytic reservoir disposed between successive bipolar cells.

15. A bipolar battery according to claim 14 further comprising a dielectric separator disposed in each electrolytic reservoir.

16. A bipolar cell comprising:

a bipolar substrate plate comprising a backbone of contiguous strands of carbon and a filler comprised of a mix comprising carbon particles and a cross-linked fluoroelastomeric material, the plate comprising two opposed generally flat surfaces;

an electrode integrally inseparably and conductively joined to each of the two plate surfaces.

* * * * *